UNITED STATES PATENT OFFICE.

MAX DIETRICH, OF FRIEDRICHSBERG, GERMANY.

PROCESS OF MAKING FOOD FROM BLOOD.

SPECIFICATION forming part of Letters Patent No. 684,978, dated October 22, 1901.

Application filed October 26, 1898. Serial No. 694,590. (No specimens.)

*To all whom it may concern:*

Be it known that I, MAX DIETRICH, a citizen of the Empire of Germany, residing at Friedrichsberg, near Berlin, Germany, have invented certain new and useful Improvements in Processes of Making Food Products, of which the following is a specification.

It is well known that the blood of healthy animals contains the salts and substances necessary for the nutrition of animal beings and that it possesses valuable curative properties. This invention relates to an improved process of making from animal blood a food product which is easily soluble and has the property of easy assimilation; and the invention consists of a process for this purpose which comprises the steps of mixing with the raw blood a small percentage of unslaked lime, allowing the free slaked lime thereby produced, together with the impurities of the blood, to settle, separating the same from the purified blood, adding to the latter a small quantity of phosphate of lime, adding to this mixture a quantity of wheat-bran or any other filling material of slightly-acid character sufficient to form a stiff composition, and lastly drying this composition at a temperature below that at which the albuminates of the same coagulate. The invention consists, further, of the food product produced by this process and consisting of a dried mixture of purified animal blood, phosphate of lime, and wheat-bran.

In carrying out my invention one hundred parts of animal blood obtained from healthy animals—for example, that obtained in slaughter-houses—is mixed with about three parts of unslaked lime, and the resulting mixture is thoroughly agitated and then permitted to settle. The free slaked lime settles to the bottom, together with all impurities in the blood, forming a sediment and leaving the purified blood above the same. The purified jelly-like mass of blood is then separated from the sediment of lime and impurities, and with the same is mixed about one part of phosphate of lime. To this mixture is added a quantity of wheat-bran or other similar substance sufficient to absorb the moisture of the blood and form with the same a stiff composition. The composition is then dried thoroughly at a temperature not exceeding that at which the albuminates of the same coagulate.

The unslaked lime sterilizes the blood and causes the precipitation of impurities contained in the same, and the free slaked lime also collects with those impurities at the bottom of the vessel, forming a sediment. The addition of phosphate of lime has two functions. First, it prevents the jelly-like mass of purified blood from rapidly coagulating and hardening, which would prevent its further use in the process, and, second, it increases the phosphate contents of the food and renders the same especially valuable for animals affected in any way with disease or weakness of bone and for draft-animals. The wheat-bran serves to absorb the moisture from the blood with which it is mixed, gives body to the food, and largely increases its nourishing qualities, since it contains a large proportion of carbohydrates.

In place of the unslaked lime and phosphate of lime, slag obtained by the Thomas Gilchrist process may be used, as it contains a large proportion of both these substances.

The food product is suitable for consumption by horses and other animals. A convenient way of feeding it is to mix it in comminuted form with the other food of the animals; but it is not repulsive to animals. On the contrary, they are attracted by it, and it may therefore be fed without mixture with other food, if desired.

The analysis of the food is as follows:

| | | |
|---|---:|---:|
| Water | | 9.076 |
| Protein | | 23.528 |
| Fat | | 0.860 |
| Carbohydrates: | | |
|   Cane-sugar | 4.642 | |
|   Dextrine | 0.508 | |
|   Starch | 47.096 | |
| | | 52.246 |
| Raw fiber | | 3.624 |
| Mineral salts | | 10.666 |
| | | 100. |

Having thus described my invention, I claim as new and desire to secure by Letters Patent—

The process herein described of producing a food product from animal blood, which consists in mixing with the raw blood a small percentage of unslaked lime, allowing the free slaked lime thereby produced, together with the impurities of the blood, to settle, separating the same from the purified blood, adding to the latter a small quantity of phosphate of lime, adding to this mixture a quantity of wheat-bran sufficient to form a stiff composition, and lastly drying this composition at a temperature below that at which the albuminates of the same coagulate, substantially as set forth.

In witness whereof I have hereunto signed my name, this 4th day of August, 1898, in the presence of two subscribing witnesses.

MAX DIETRICH.

Witnesses:
CARL ALBRECHT,
C. H. DAY.